Feb. 16, 1926.
F. TOMLINSON
COUPLING FOR METAL TUBES
Filed Feb. 28, 1924

1,573,103

INVENTOR
FREDERICK TOMLINSON
BY: Francis E. Boyce
ATTORNEY

Patented Feb. 16, 1926.

1,573,103

UNITED STATES PATENT OFFICE.

FREDERICK TOMLINSON, OF SALFORD, ENGLAND.

COUPLING FOR METAL TUBES.

Application filed February 28, 1924. Serial No. 695,680.

*To all whom it may concern:*

Be it known that I, FREDERICK TOMLINSON, a subject of the King of Great Britain, residing at Salford, in the county of Lancaster, England, have invented new and useful Improvements in or Relating to Couplings for Metal Tubes, of which the following is a specification.

The invention relates to improvements in or relating to couplings for metal tubes and has for its object to provide a coupling for such tubes in which a perfect joint will be made between the two ends of the tubes to be coupled up.

As is well known, the best form of joint between two surfaces is formed by a knife edge or line contact and it is this form which I employ in my device for the purpose of ensuring a perfect joint.

I will now describe my invention with reference to the accompanying drawings in which—

Figure 1:
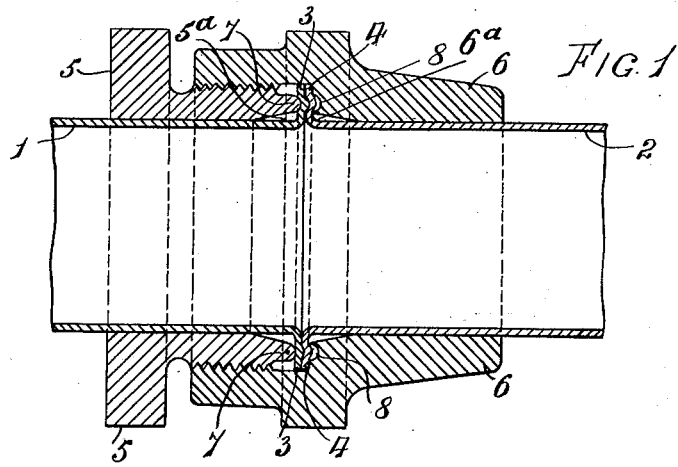
Figure 1 is a section of a coupling for metal tubes constructed according to the present invention.
Figure 2:
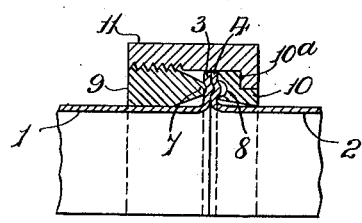
Figure 2 is a section of a modification thereof.

Referring to Figure 1, 1 and 2 represent two copper or other metal tubes of small gauge having formed thereon plain flanges 3 and 4, and adapted to loosely slip upon the tubes 1 and 2 respectively but of too small a bore to pass over the said flanges 3 and 4 are two half couplings 5 and 6 constructed and adapted to be screwed together in the well known manner.

The half coupling 5 is provided internally with a convex rim or flange 7 and the other half coupling 6 is provided internally with a concave rim or flange 8, said rim or flange 8 forming two concentric annular edges adapted to abut against the said convex rim or flange 7 upon the half coupling 5 hereinbefore described. The half couplings 5 and 6 are constructed in such manner that spaces 5ª and 6ª are provided between the same and the tubes 1 and 2 to allow for bending stresses.

In operation the two half couplings 5 and 6 are placed upon their respective tubes 1 and 2 and said tubes 1 and 2 are placed together end to end in such manner that the two flanges 3 and 4 coincide and the two half couplings 5 and 6 are then screwed together.

In the tightening of the half couplings 5 and 6 the convex rim or flange 7 presses the two flanges 3 and 4 of the tubes 1 and 2 together against the two edges of the concave rim or flange 8 in such manner that the inner and outer edges of the concave or like rim or flange 8 produce two concentric lines of contact between said tube flanges 3 and 4 which are thus moulded or pressed, the flange 3 into a concave formation and the flange 4 into a convex formation. Thus in case the inner or the outer edge does not make a good joint the other edge or line of contact may be relied upon.

In Figure 2 is illustrated a modification of the device incorporating the same methods of making contact between the tubes 1 and 2, but in this case I employ two sleeves 9 and 10 adapted to fit upon the tubes 1 and 2 respectively, the sleeve 9 having a convex rim or flange 7 therein, and the other sleeve 10 having a concave rim or flange 8 thereon operating as above described with regard to Figure 1, and a coupling sleeve 11 is provided adapted to abut against the shoulder 10ª of the sleeve 10 and to be screwed upon the sleeve 9 in such manner that the two sleeves 9 and 10 may be tightened up so as to make a tight joint in the manner hereinbefore described.

In the case of thick or large gauge tubes the flanges are preferably given the requisite formation before coupling up.

Although the invention is primarily designed for coupling copper tubes it will be understood that it may be found useful for tubes of other metal.

What I claim as my invention and desire to secure by Letters Patent is:—

1. In a coupling for metal tubes having radially flanged abutting ends, a sleeve loosely fitting upon each of the tubes adapted to abut against the flanges thereof, one sleeve having an annular recess in the end thereof, a projection on the end of the other sleeve, and means for forcing said sleeves together, said flanges, annular recess and projection, having a double line contact between the same formed by forcing said sleeves together.

2. In a coupling for metal tubes having radially flanged abutting ends, a sleeve loosely fitting one tube and having an annular recess in one end abutting one flange, a sleeve loosely fitting the other tube and having at its end a projection adapted to abut against the other flange, an outer sleeve for forcing said sleeves together to cause the projection of one sleeve to press the flanges of the tubes against the outer edges of the recess of the other sleeve making a double line contact joint, said tubes and said sleeves having spaces between them to allow for bending stresses.

In testimony whereof I have signed my name to this specification.

FREDERICK TOMLINSON.